United States Patent
Shultz et al.

(10) Patent No.: US 10,652,093 B1
(45) Date of Patent: May 12, 2020

(54) AUTOMATED NONDISRUPTIVE MERGE OF MANAGEMENT SYSTEMS

(71) Applicant: INTERNATIONAL BUSINESS MACHINES CORPORATION, Armonk, NY (US)

(72) Inventors: Steven Shultz, Endicott, NY (US); Paul S. Wiggins, Kingston, NY (US); Charles J. Brazie, Newark Valley, NY (US); Karen A. Gardner, Vestal, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 16/166,508

(22) Filed: Oct. 22, 2018

(51) Int. Cl.
*G06F 15/16* (2006.01)
*H04L 12/24* (2006.01)
*G06Q 10/06* (2012.01)
*G06F 9/50* (2006.01)

(52) U.S. Cl.
CPC ........ *H04L 41/0893* (2013.01); *G06F 9/5005* (2013.01); *G06F 9/5061* (2013.01); *G06Q 10/06312* (2013.01); *H04L 41/0813* (2013.01); *H04L 41/0876* (2013.01)

(58) Field of Classification Search
CPC ............................ H04L 41/0893; G06F 9/5061
USPC .......................................... 709/221, 223–225
See application file for complete search history.

(56) References Cited

U.S. PATENT DOCUMENTS

| | | | |
|---|---|---|---|
| 7,356,679 B1* | 4/2008 | Le ....................... | G06F 9/45558 713/1 |
| 8,775,593 B2 | 7/2014 | O'Sullivan | |
| 8,909,767 B2 | 7/2014 | Sunkara | |
| 9,590,917 B2 | 3/2017 | Karunamoorthy | |
| 2003/0187818 A1* | 10/2003 | McCarty ............ | G06F 9/44505 |
| 2005/0102683 A1* | 5/2005 | Branson ................. | G06F 9/541 719/328 |
| 2006/0179171 A1* | 8/2006 | Stefaniak .............. | G06F 9/5061 710/15 |
| 2009/0073896 A1 | 3/2009 | Gillingham | |
| 2014/0059307 A1* | 2/2014 | Blea .................... | G06F 11/1471 711/162 |
| 2015/0372935 A1* | 12/2015 | kervik ................. | H04L 67/1097 709/226 |

* cited by examiner

*Primary Examiner* — Duyen M Doan
(74) *Attorney, Agent, or Firm* — Cantor Colburn LLP; Edward Wixted

(57) ABSTRACT

A computer-implemented method includes generating a new management application based on a first management application, where the first management application operates a first management system. A first set of resources of the first management system are assigned to the new management application, where the first set of resources support a first request server and a first worker server. A new worker server of the new management system is started, where the new worker server utilizes the first set of resources. The first request server is instructed to send a first set of future requests of the first request server to the new worker server. The first request server is further instructed to redirect a remainder of the future requests of the first request server to a new request server of the new management application. The new management application operates a new management system based on the first management system.

20 Claims, 5 Drawing Sheets

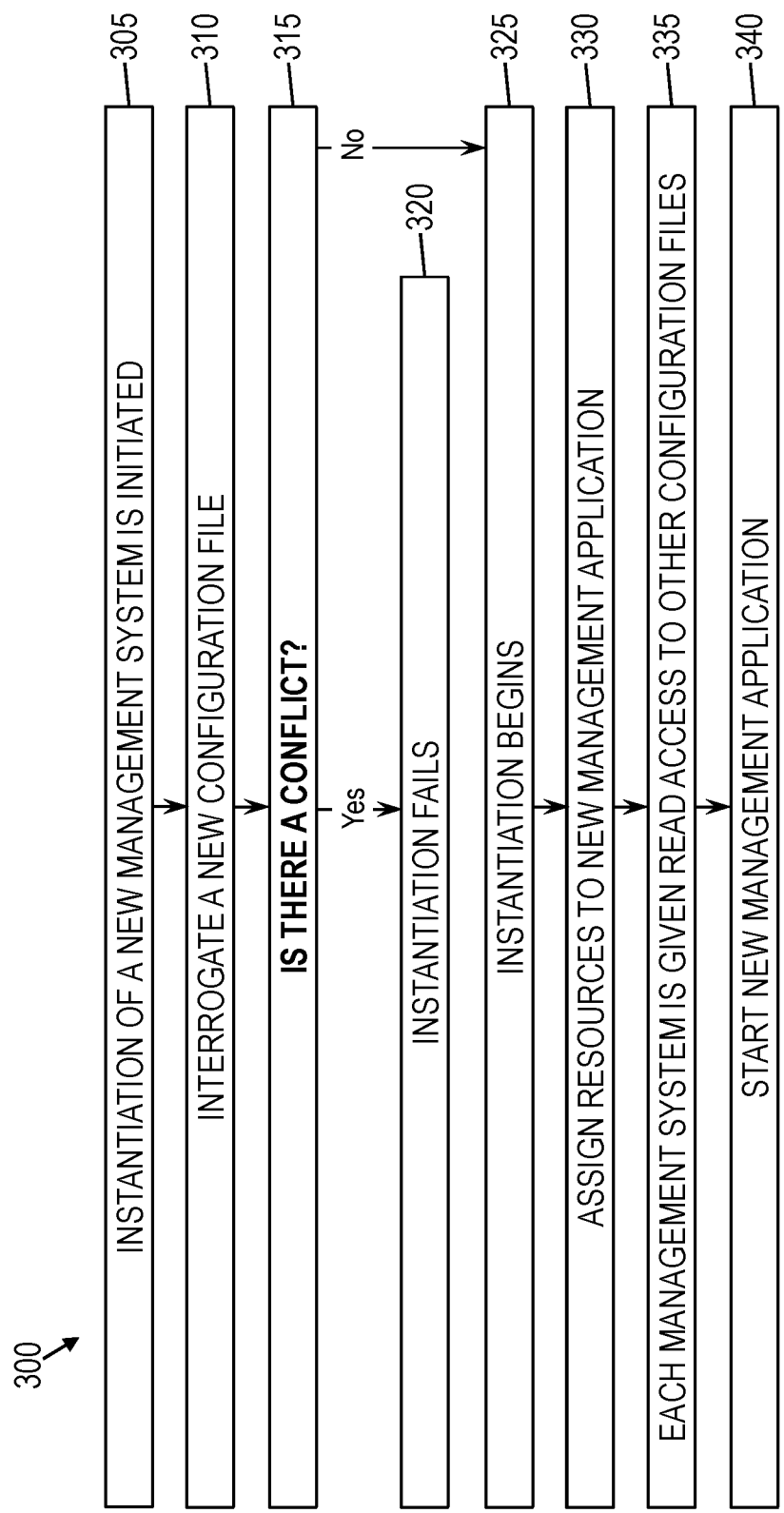

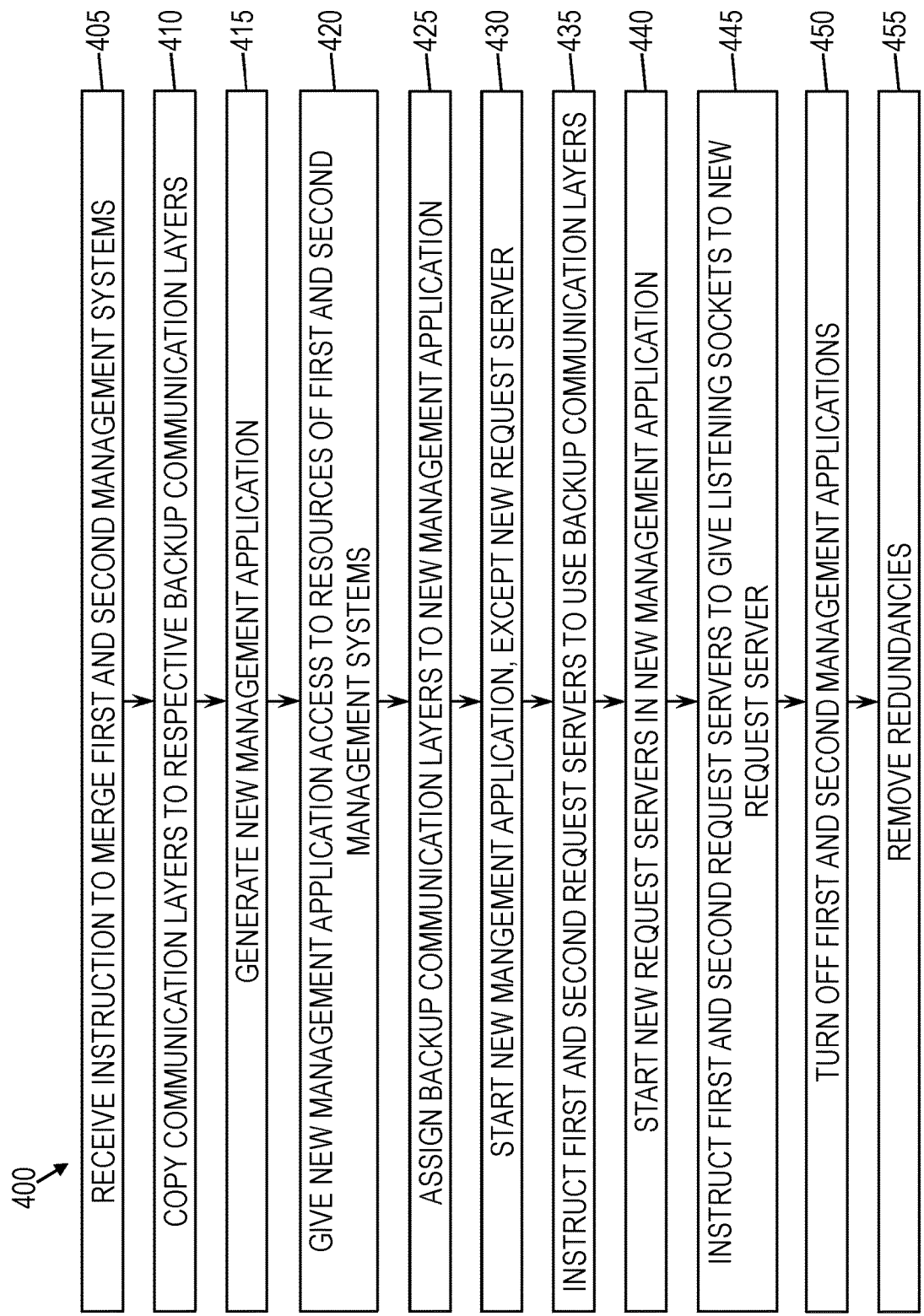

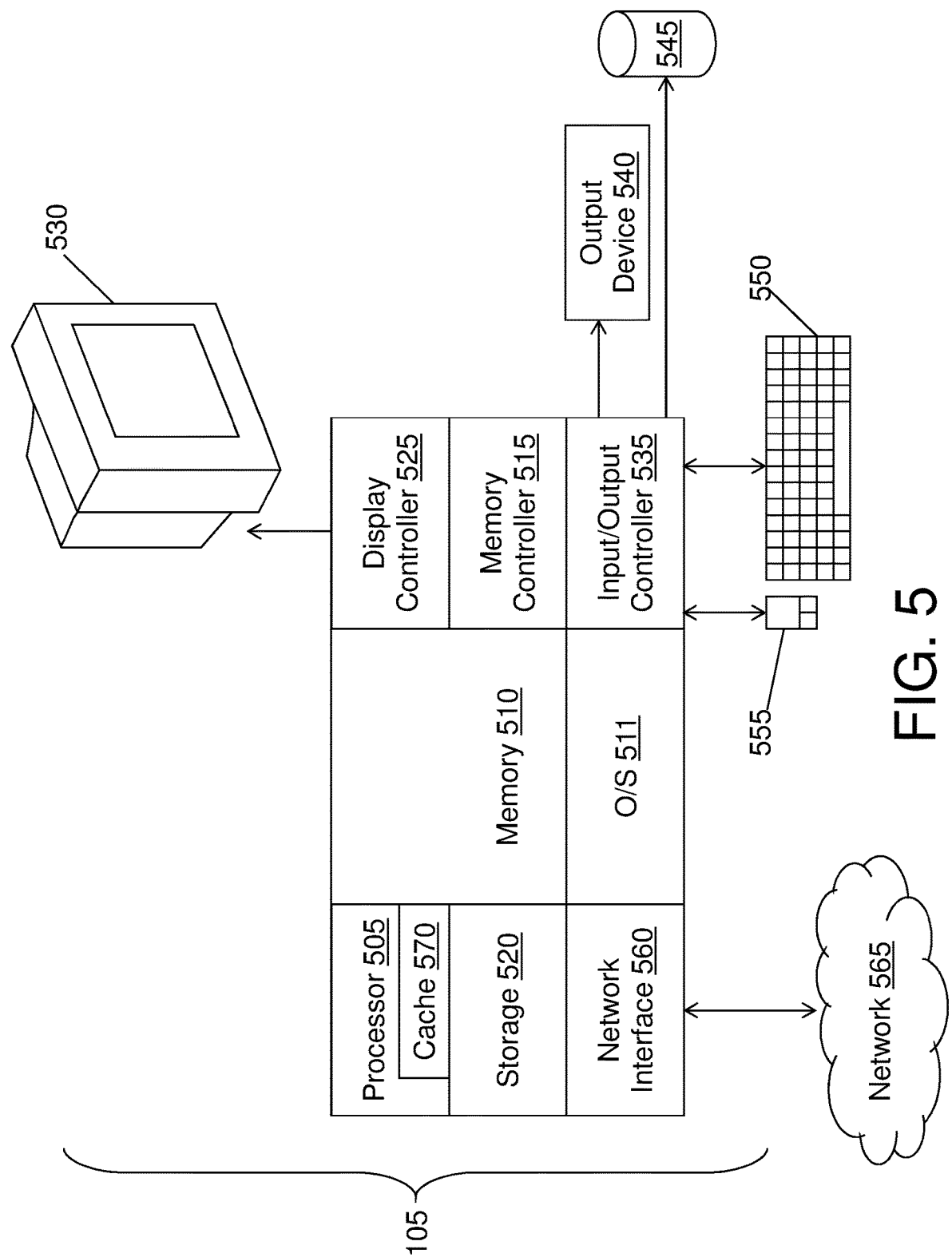

AUTOMATED NONDISRUPTIVE MERGE OF MANAGEMENT SYSTEMS

BACKGROUND

The present invention relates to management systems and, more specifically, to an automated nondisruptive merge of management systems.

A management system is a type of computer system, which may be distributed, used to manage the resources of an organization, perform services, and generally perform various other tasks needed by the organization. Within an enterprise, multiple organizations might exist, and each might have its own management system. Thus, not only are there multiple management systems across enterprises, but there are often multiple management systems within an enterprise.

In some cases, it becomes necessary to merge management systems. This may be desirable, for example, in the case of a reorganization, such as the merging of two departments, each with its own respective management system. Merging management systems may also be desirable when merging enterprises or when revamping how computing resources are obtained, allocated, or accounted.

SUMMARY

Embodiments of the present invention are directed to a computer-implemented method for updating a management system. A non-limiting example of the computer-implemented method includes generating a new management application based on a first management application, where the first management application operates a first management system. A first set of resources of the first management system are assigned to the new management application, where the first set of resources support a first request server and a first worker server. A new worker server of the new management system is started, where the new worker server utilizes the first set of resources of the first management system. The first request server is instructed to send a first set of future requests of the first request server to the new worker server. The first request server is further instructed to redirect a remainder of the future requests of the first request server to a new request server of the new management application. The new management application operates a new management system based on the first management system.

Embodiments of the present invention are directed to a system for updating a management system. A non-limiting example of the system includes a memory having computer-readable instructions and one or more processors for executing the computer-readable instructions. The computer-readable instructions include generating a new management application based on a first management application, where the first management application operates a first management system. Further according to the computer-readable instructions, a first set of resources of the first management system are assigned to the new management application, where the first set of resources support a first request server and a first worker server. A new worker server of the new management system is started, where the new worker server utilizes the first set of resources of the first management system. The first request server is instructed to send a first set of future requests of the first request server to the new worker server. The first request server is further instructed to redirect a remainder of the future requests of the first request server to a new request server of the new management application. The new management application operates a new management system based on the first management system.

Embodiments of the invention are directed to a computer-program product for updating a management system, the computer-program product including a computer-readable storage medium having program instructions embodied therewith. The program instructions are executable by a processor to cause the processor to perform a method. A non-limiting example of the method includes generating a new management application based on a first management application, where the first management application operates a first management system. Further according to the method, a first set of resources of the first management system are assigned to the new management application, where the first set of resources support a first request server and a first worker server. A new worker server of the new management system is started, where the new worker server utilizes the first set of resources of the first management system. The first request server is instructed to send a first set of future requests of the first request server to the new worker server. The first request server is further instructed to redirect a remainder of the future requests of the first request server to a new request server of the new management application. The new management application operates a new management system based on the first management system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a flow diagram of a method of creating a new management system, according to some embodiments of the invention;

FIG. 4 is a flow diagram of a method of merging two or more management systems, according to some embodiments of the invention; and FIG. 5 is a block diagram of a computer system for implementing some or all aspects of the merger system, according to some embodiments of this invention.

Figure 1:
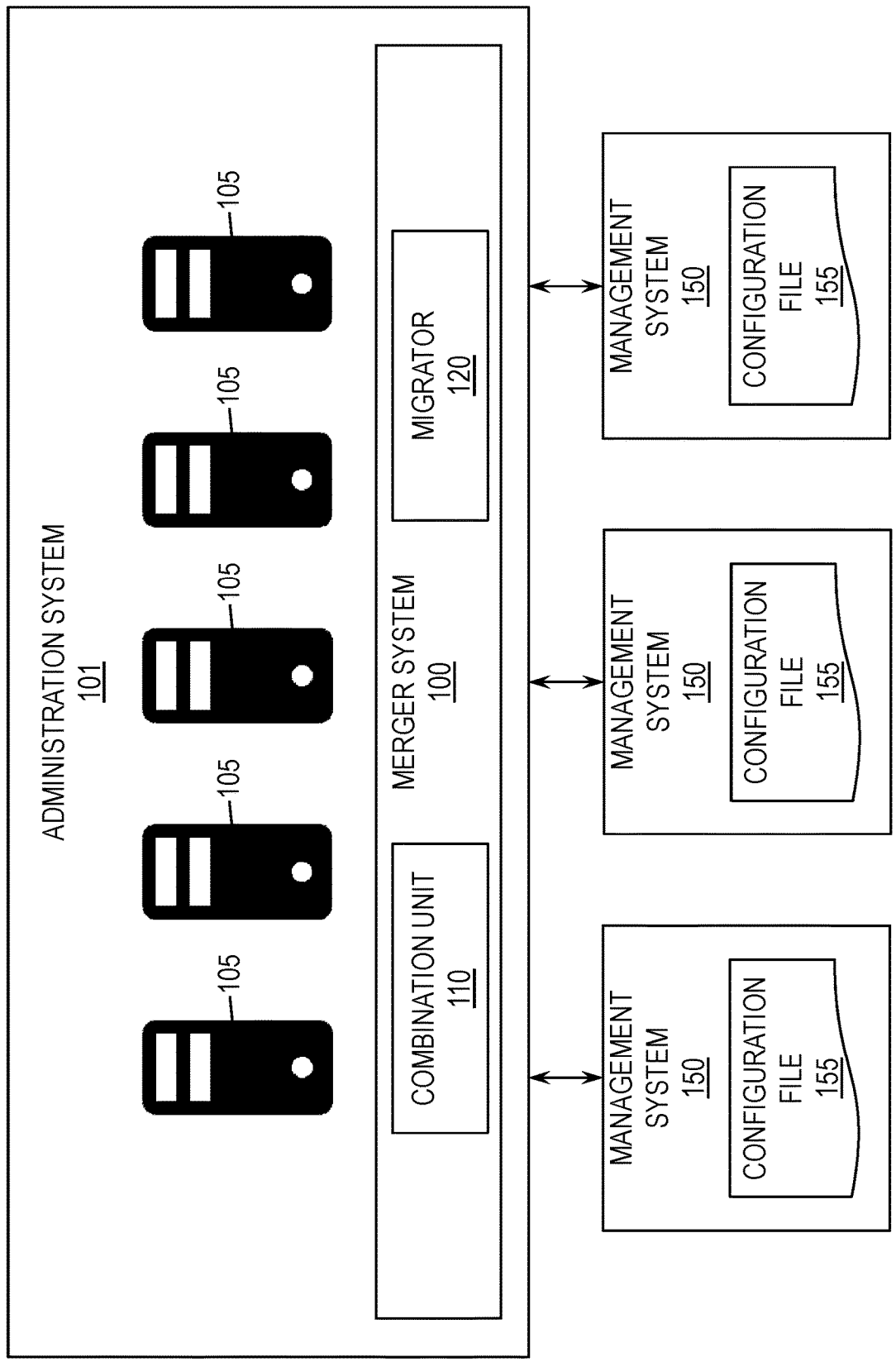
FIG. 1 is a diagram of a merger system according to some embodiments of the invention.

The diagrams depicted herein are illustrative. There can be many variations to a diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, with conventional management systems, there is no automated way to merge management systems. A conventional management system views itself as the only management system that exists and is thus not optimized for the merger. As a result, merger generally requires manual intervention, which is slow and error-prone. Further, manual merger requires the management systems involved to go offline until the merger is complete, which can be detrimental to normal operations. One way to address mergers is to splice code into a running management application of a management system. In practical terms, this means the management application must be architected specifically to enable splicing, which increases the cost of service. Further, if a splice must occur at an unexpected location within the code, then once again, manual intervention is required, and the management systems involved go offline.

Turning now to an overview of the aspects of the invention, one or more embodiments of the invention address the above-described shortcomings of the prior art by providing a new architecture for management systems and for merging such management systems in a way that is effectively instantaneous. More specifically, according to some embodiments of the invention, each management system includes a management application and a set of resources, as well as a request server, a worker server, and a response server operated through the management application. A new management application may be created based on first and second management applications belonging to first and second management systems, respectively, to be merged. The new management application may be given access to the resources of the first and second management applications, and the request servers, worker servers, and response servers of the new management application may gradually take over operations of the first and second management applications, as will be described herein.

The above-described aspects of the invention address the shortcomings of the prior art by defining an improved mechanism of merging two or more management systems that utilize a new format of a management system. According to some embodiments of the invention, the merger process is automated, and services do not need to go offline while management systems are being merged. Further, the code in management applications does not need to be architected to enable splicing, and human error is reduced or eliminated.

Turning now to a more detailed description of aspects of the present invention, FIG. 1 is a diagram of a merger system 100 according to some embodiments of the invention. As shown in FIG. 1, the merger system 100 applies to two or more management systems 150, each of which may be a computer system 105, which may be physical, virtual, distributed, or a combination thereof. The management systems 150 may be administered through an administration system 101, which may be in communication with the merger system 100. For example, and not by way of limitation, the merger system 100 may be integrated into the administration system 101, such that the administration system 101 may be configured to merge management systems 150 through use of the merger system 100 as described herein. The administration system 101 may manage a set of computer systems 105, and the management systems 150 may utilize resources of such computer systems 105.

Each management system 150 may be associated with a configuration file 155. The management systems 150 and the respective configuration files 155 will be described in more detail below. The merger system 100 may take as input a respective configuration file 155 of each management system 150 to be merged, as well as a prospective configuration file 155 of a new management system 150 to result from the merger.

The merger system 100 may include a combination unit 110 and a migrator 120. Generally, the combination unit 110 may determine how to combine the respective configuration files 155 of the existing management systems 150 to result in the prospective configuration file 155, and the combination unit 110 may thus identify and remove any redundancies across the existing management systems 150. Generally, the migrator 120 may migrate resources managed by the existing management system 150 to the final management system 150, such as by updating permissions of the resources. Each of the combination unit 110 and the migrator 120 may include hardware, software, or a combination of both. For instance, each of these components may be a software module or a specialized hardware device. Additionally, while the combination unit 110 and the migrator 120 are illustrated and described herein as being distinct, it will be understood that this distinction is for illustrative purposes only, and these components may be integrated together or further divided.

Figure 2:
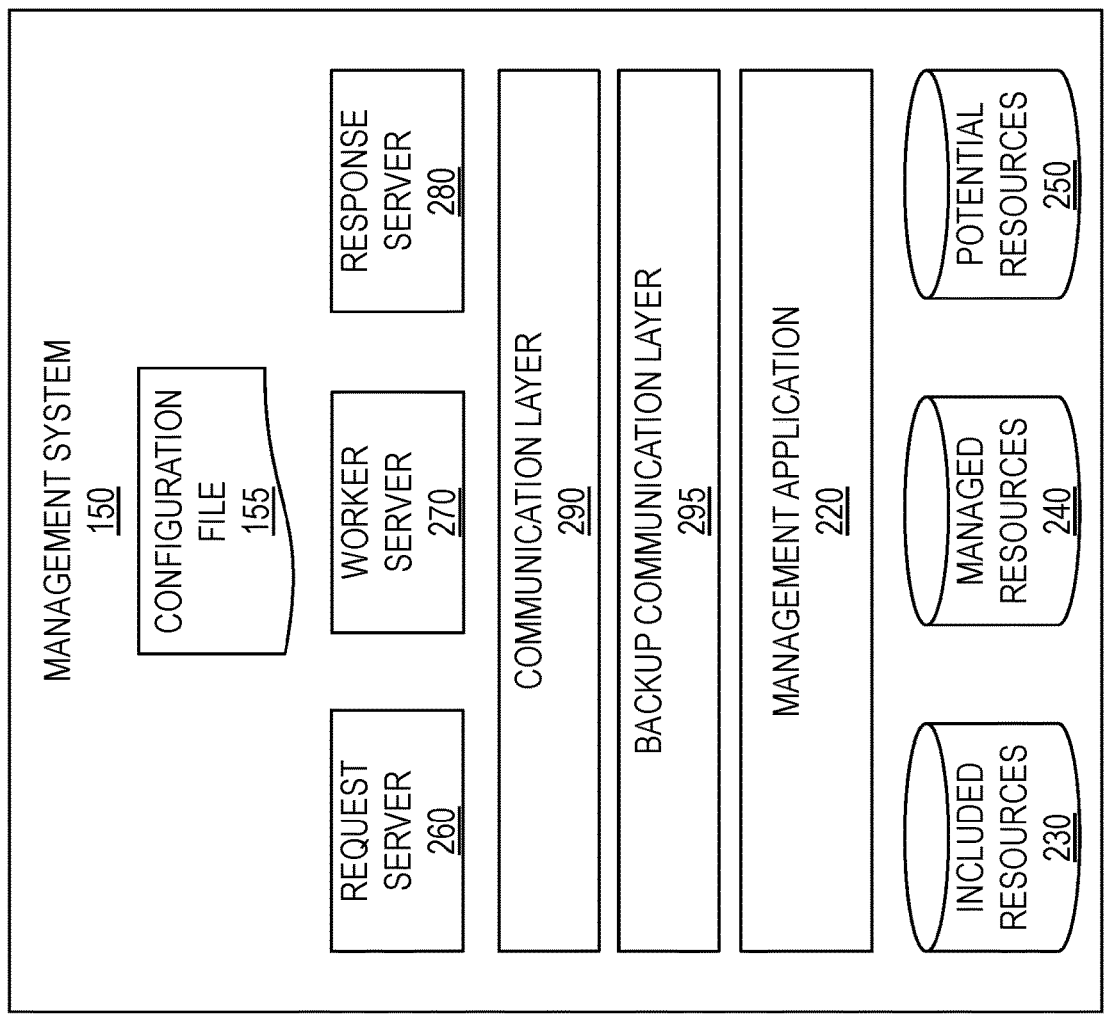
FIG. 2 is a diagram of a management system according to some embodiments of the invention.

FIG. 2 is a diagram of a management system 150 according to some embodiments of the invention. More specifically, each management system 150 may include, or be otherwise associated with, a configuration file 155. Each management system 150 may also include a management application 220, also referred to as an instance of a management application or a management application instance, and set of resources. The set of resources may include one or more of the following: a set of included resources 230, a set of managed resources 240, and a set of potential resources 250.

In some embodiments of the invention, the configuration file 155 of a management system 150 describes aspects of the management system 150, such as the included resources 230, the managed resources 240, the potential resources 250, and the communication layer 290. In some embodiments of the invention, the management application 220 has exclusive write access to its respective configuration file 155, included resources 230, managed resources 240, and potential resources, as well as read access to the configuration files 155 of other management systems 150. Generally, the management application 220 may enable an administrator of the management system 150 to access and utilize the associated resources of the management system 150, including the installation and use of user applications.

The included resources 230 may include one or more central processing units (CPUs), servers, disk spaces, network resources, or other resources useable to perform tasks of the management system 150. In some embodiments of the invention, a management system 150 may run at least one request server 260, at least one worker server 270, and at least one response server 280, and the management system 150 may have at least one communication layer 290. These components may run over the included resources 230. Each of the request server 260, the worker server 270, and the response server 280 may include hardware, software, or a combination of both. The management application 220 may include code that instructs operations of these components. For example, and not by way of limitation, the request server 260, the worker server 270, and the response server 280 may be implemented as software, and the management application 220 may incorporate code for their implementation. Generally, the request server 260, which may be a web server, may receive requests from outside of the management system 150. The request server 260 may perform preprocessing as needed and may then route each request to the worker server 270. The worker server 270 may perform work to respond to each request, and the response server 280 may issue responses to locations outside of the management system 150. Each such server may utilize included resources 230 of the management system 150. It will be understood that the request server 260, the worker server 270, and the response server 280 may, but need not, utilize distinct resources from one another. For example, and not by way of limitation, these servers may utilize some of the same hardware or software.

The managed resources 240 may include one or more CPUs, servers, disk spaces, network resources, or other resources managed by the management system 150. Analogously, the potential resources 250 may include one or more CPUs, servers, disk spaces, network resources, or other resources. The potential resources 250 are resources specified in the configuration file 155 as having the potential to be used by the management system 150. Generally, an included resource 230 may be a part of the management system 150, a managed resource 240 may be managed by the management system 150, and a potential resource 250 need not be in use at the time of creation, or instantiation, of the management system 150.

The communication layer 290, also referred to as the primary communication layer, may define protocols for communications with and among the request server 260, the worker server 270, and the response server 280. In other words, the communication layer 290 may define interactions between each pair of these servers, interactions between these servers and other resources, and interactions between these servers and the world outside the management system 150. The communication layer 290 may be viewed as an interface or combination of interfaces. In some embodiments of the invention, a management system 150 additionally includes a backup communication layer 295, which has the same capabilities as the primary communication layer 290, used as described below.

The management application 220 may manage the various aspects of the management system 150. On relatively large enterprise systems, it is common for multiple tenants to share resources while ideally allowing no tenant to interfere or have knowledge of any other tenant. For instance, if the tenants are renting portions of resources from an owner, then it is critical that the owner ensure that each tenant, and confidential data of that tenant, is being kept separate from other tenants. In this example, the owner runs the administration system 101, and each tenant runs an associated management system 150. The form of management systems 150 described herein enables a multi-tenant environment by allowing a respective management application 220 to manage respective aspects of a corresponding management system 150. As such, various management systems 150 may, but need not, share one or more computer systems 105, such that each management system 150 has a dedicated set of resources, which may be physical or virtual. According to some embodiments of the invention, each management application 220 and corresponding management system 150 functions independently, even if sharing a computer system 105 with other management systems 150 and management applications 220.

Conventionally, multi-tenant environments are accomplished by running one instance of a management application 220, with each tenant represented by a single user or set of users within that single application. This arrangement presents a variety of weaknesses. For instance, conventionally, all the tenants are managed by the same management code in that single management application 220, so if a change to the management code is necessary for one tenant, all other tenants are forced to accept the change. Also conventionally, there is at least one administrator that can access the data of every tenant, and thus there exists a security risk that must be zealously guarded. Further, because resources are being shared, one user's use of computing capacity affects the capacity available to others.

With multiple distinct management applications 220, according to some embodiments of the invention, the above weaknesses and others are mitigated. Each management application 220 may run its own code, thereby allowing each management application 220 to be independently updated. In some embodiments of the invention, no administrator of a management system 150 is required to have access to all management applications 220 or all management systems 150. Rather, each management instance can be assigned its own set of computing resources, specifically, for instance, the included resources 230, the managed resources 240, and the potential resources.

FIG. 3 is a flow diagram of a method 300 of creating a new management system 150 according to some embodiments of the invention. As discussed above, the new management system 150 may run on one or more computer systems 105 along with one or more other management systems 150. According to some embodiments of the invention, before the new management system 150 can be instantiated, a new configuration file 155 describing the new management system 150 may be established. For example, and not by way of limitation, the new configuration file 155 may be established manually or automatically by a service provider who desires to establish a new tenancy with a new customer, where the new configuration file 155 is designed to suit the new customer's needs, and where the new customer will utilize the new management system 150. Thus, this method 300 of creating a new management system 150 assumes that the new configuration file 155 exists. In some embodiments of the invention, this method 300 of creating a management system 150 may be performed at the administration system 101.

As shown in FIG. 3, at block 305, instantiation of the new management system 150 may be initiated. For example, and not by way of limitation, this initiation may be in the form of an instruction received from an administrator of the administration system 101. At block 310, the administration system 101 may interrogate the new configuration file 155 and may compare the new configuration file 155 to existing configuration files 155 of existing management systems 150.

At decision block 315, it may be determined whether a conflict exists between the new configuration file 155 and the existing configuration files 155. In some embodiments of the invention, a conflict is deemed to exist when the new configuration file 155 specifies a resource, which may be an included resource 230, a managed resource, or a potential resource 250, that is unavailable due to existing configuration files 155. In other words, an overlap of resources may be deemed a conflict. It will be understood that, in some cases, certain resources may be shared across management systems 150 through virtualization. However, in that case, certain capacities of such a shared resource may be dedicated to respective management systems 150. When a configuration file 155 specifies a capacity of a resource, where that capacity is unavailable, then a conflict is deemed to occur.

If there is a conflict, then instantiation may fail at block 320. In that case, the administration system 101 may issue a notification of failure to the administrator.

If no conflict is found, however, then instantiation begins at block 325. At block 330, the resource assignments in the new configuration file 155 are made. In other words, for instance, permissions of the various included resources 230, managed resources 240, and potential resources 250 specified in the new configuration file 155 may be updated to provide read and write permission to a new management application 220. Additionally, access to the new management application 220 may be assigned to a new administrator of the new management system 150. At block 335, other management systems 150 may be provided read access to the new configuration file 155, and the new management application 220 may be provided read access to the configuration files 155 of other management systems 150. At block 340, the new management application 220 may be started, thereby starting the new management system 150.

As such, authorized users of the new management system 150 may thus use the new management application 220 as if it is the only management application 220 on the administration system 101. The management application 220 may extend, reduce, or modify resources in the new management system 150, as long as the management application 220 remains within the bounds of the new configuration file 155, thus maintaining the lack of conflict with other management systems 150. However, according to some embodiments of the invention, the management application 220 is unable to access included resources 230, managed resources 240, and potential resources 250 of other management systems 150, and analogously other management applications 220 are unable to access included resources 230, managed resources 240, and potential resources of the new management system 150.

According to some embodiments of the invention, resources can be nondisruptively migrated between management systems 150, thereby enabling management systems 150 to be updated or merged through the process of such migration. To this end, generally, for a particular management system 150, a new management application 220 may be established as a copy of the original management application 220. Initially, the new management application 220 does not control the various resources of the original management application 220. As needed, changes are made to update code of the new management application 220, thereby making the new management application 220 an updated version of the original management application 220. Then the resources of the management system 150 may be migrated to the control of the new management application 220. The new management application 220 may then become the primary management application 220 for the management system 150. According to some embodiments of the invention, with this approach, all application code can be updated or otherwise serviced nondisruptively, and no code has to be architected to facilitate splicing. This process of upgrading a management system 150 may be extended to merge management systems 150, such that a resulting new management system 150 is effectively an updated version of two or more management systems 150 combined together. The details of such of merger are discussed below.

FIG. 4 is a flow diagram of a method 400 of merging two or more management systems 150, according to some embodiments of the invention. In some embodiments of the invention, this method 400 may be performed at the merger system 100. According to some embodiments of the invention, the management systems 150 described above provide advantages over conventional management systems 150. One of such advantages is the ability to be automatically merged, as discussed herein. Although only two management systems 150 are discussed below, one of skill in the art will understand how to extend this method 400 to merge two or more management systems 150. Further, in this example, each management system 150 includes at least one request server 260, at least one worker server 270, and at least one response server 280. However, it will be understood that this method 400 is extensible to management systems 150 that do not have these servers. Further, although this disclosure refers to various management systems 150 each having a single request server 260, a single worker server 270, and a single response server 280, it will be understood by one skilled in the art that each management system 150 may have one or more multiple servers of each of these types.

As shown in FIG. 4, at block 405, an instruction may be received to merge a first management system 150 and a second management system 150. The first management system 150 is associated with a first configuration file 155 and a first management application 220, and includes a first request server 260, a first worker server 270, and a first response server 280. Analogously, the second management system 150 is associated with a second configuration file 155 and a second management application 220, and includes a second request server 260, a second worker server 270, and a second response server 280. Additionally, the instruction to merge may include a prospective configuration file 155. The prospective configuration file 155 may specify the desired configuration, such as included resources 230, managed resources 240, and potential resources 250, of a new management system 150 to result from the merger.

At block 410, for each management system 150 to be merged, a respective backup communication layer 295 may be created based on the respective primary communication layer 290. In some cases, a management system 150 may already have a backup communication layer 295 in addition to the primary communication layer 290. In that case, no new backup communication layer 295 need be made for that management system 150. At this point, each management system 150 to be merged may include both a primary communication layer 290 and a backup communication layer 295, where the respective primary communication layer 290 is active for each of the management systems 150 to be merged.

At block 415, a new management application 220 may be generated, where the new management application 220 is a combination of both the first and second management applications 220. For example, and not by way of limitation, the new management system 150 may include a copy of the code of the first management application 220, a copy of the code of the second management application 220, and code to enable either copy to be executed on command.

At block 420, the new management application 220 may be given access to the resources of both the first management system 150 and the second management system 150. In other words, for instance, the permissions of the included resources 230, the managed resources 240, and the potential resources 250 of each of the first management system 150 and the second management system 150 may be updated to allow read and write access to the new management application 220. As a result, the request servers 260, the worker servers 270, and the response servers 280 of each of the first and second management systems 150 may now be readable and writable by the new management application 220.

According to some embodiments of the invention, at this point, the respective management applications 220 of the first and second management systems 150 are still controlling resources of the first and second management systems 150, although the new management application 220 now has access to these resources as well. In other words, the new management application 220 may be dormant, with its versions of the request servers 260, the worker servers 270, and the response servers 280 not having started.

At block 425, the backup communication layers 295 of the first and second management systems 150 may be assigned to the new management system 150 and may become active for the new management system 150. In other words, the new management system 150 may be able to utilize the backup communication layers 295 of the first and second management systems 150 to enable communications needed for operations of the request servers 260, the worker servers 270, and the response servers 280 of the new management system 150. The backup communication layers 295 of the first and second management systems 150 may, therefore, become primary communication layers 290 for the new management system 150.

At block 430, the new management application 220 may start, with the exception of its request servers 260. For instance, the new worker servers 270 and the new response servers 280 may start in the new management application 220. More specifically, code within the new management application 220 that provides instructions to the worker servers 270 and the response servers 280 may be executed. The worker servers 270 and the response servers 280 may utilize the same resources as the respective worker servers 270 and response servers 280 of the first and second management systems 150.

At block 435, the respective request servers 260 of the first management application 220 and the second management application 220 may be directed to forward requests through their respective backup communication layers 295. Because the backup communication layers 295 are now assigned to the new management system 150, this may effectively cause the request servers 260 of the first and second management systems 150 to forward their requests to the new worker servers 270 and new response servers 280 of the new management system 150. Thus, according to some embodiments of the invention, all management functions except for receipt of requests are now being executed by the new management system 150.

At block 440, the new request servers 260 are started in the new management application 220. At block 445, the first request server 260 and the second request server 260 of the first and second management applications 220 are instructed to redirect future requests to the new request servers 260, such as by giving their respective listening sockets or other client interfaces to the new request servers 260, for example. As such, no more requests are received at the first and second request servers 260, but instead, requests are received at the new request servers 260. At block 450, the first and second management applications 220 may now be turned off, or they may continue to run in a dormant state while no longer handling requests or work.

At block 455, redundancies across the resources of the first and second management systems 150 may be recognized and removed. For instance, a redundancy may be recognized through comparison of the first and second configuration files 155 to the prospective configuration file 155. In other words, more generally, when the first and second configuration files 155 are summed and the prospective configuration file 155 is subtracted from the resulting sum, then the difference is a set of redundant resources. This summing and subtracting may be performed for each category of resource to identify the redundancies within each category. Additionally, in some embodiments of the invention, the merger system 100 may be aware that only a fixed number of certain resources are needed. For instance, if it is determined that only a single request server 260 is needed, thus consolidating an interface for external entities interacting with the new management system 150, then the merger system 100 may identify additional request servers 260 to be redundant. In that case, for instance, the merger system 100 may combine the code for the two or more request servers 260 into a single request server 260, or may alert an administrator to do so.

As a result, the two or more management systems 150 have now been merged into a single, new management system 150 without disruption. In some embodiments of the invention, the new management system 150 includes the new management application 220, which is based on the management applications 220 of the merged management systems 150, as well as the included resources 230, managed resources 240, and potential resources 250 of the merged management applications 220, potentially without redundancies.

FIG. 5 is a block diagram of a computer system 105 for implementing some or all aspects of the merger system 100, according to some embodiments of this invention. The merger systems 100 and methods described herein may be implemented in hardware, software (e.g., firmware), or a combination thereof. In some embodiments, the methods described may be implemented, at least in part, in hardware and may be part of the microprocessor of a special or general-purpose computer system 105, such as a personal computer, workstation, minicomputer, or mainframe computer. For instance, as shown in FIG. 1, each management system 150 may utilize resources of one or more computer systems 105 and may thereby run across one or multiple such computer systems 105. Additionally, each of the combination unit 110 and the migrator 120 of the merger system 100 may be implemented as one or more computer systems 105 or portions thereof.

In some embodiments of the invention, as shown in FIG. 5, the computer system 105 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 105, a semiconductor-based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid-state drive. The stored instructions in memory 510 or in storage 520 may include those enabling the processor to execute one or more aspects of the merger systems 100 and methods of this disclosure.

The computer system 105 may further include a display controller 525 coupled to a display 530. In some embodiments, the computer system 105 may further include a network interface 560 for coupling to a network 565. The network 565 may be an IP-based network for communication between the computer system 105 and an external server, client and the like via a broadband connection. The network 565 transmits and receives data between the computer system 105 and external systems. In some embodiments, the network 565 may be a managed Internet Protocol (IP) network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Merger systems 100 and methods according to this disclosure may be embodied, in whole or in part, in computer program products or in computer systems 105, such as that illustrated in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating a new management application based on a first management application, wherein the first management application operates a first management system;
assigning a first set of resources of the first management system to the new management application, wherein the first set of resources support a first request server and a first worker server;
starting a new worker server of the new management system, wherein the new worker server utilizes the first set of resources of the first management system;
instructing the first request server to send a first set of future requests of the first request server to the new worker server; and
instructing the first request server to redirect a remainder of the future requests of the first request server to a new request server of the new management application;
wherein the new management application operates a new management system based on the first management system.

2. The computer-implemented method of claim 1, wherein the new management application is further based on a second management system, and the computer-implemented method further comprising:
assigning a second set of resources of the second management system to the new management application, wherein the second set of resources support a second request server and a second worker server;
wherein the new worker server utilizes the second set of resources of the second management system;
instructing the second request server to direct future requests of the second request server to the new worker server; and
instructing the second request server to redirect future requests to the new request server of the new management application;
wherein the new management system is a merger of the first management system and the second management system.

3. The computer-implemented method of claim 2, wherein the merging is performed absent taking the first management system or the second management system offline.

4. The computer-implemented method of claim 2, wherein a first configuration file defines a configuration of the first management system, and wherein a second configuration file defines a configuration of the second management system, and the computer-implemented method further comprising:
receiving an instruction to merge the first management system and the second management system, wherein the instruction is associated with a prospective configuration file defining a configuration of the new management system.

5. The computer-implemented method of claim 4, further comprising identifying a redundancy in the new management system by comparing the first configuration file and the second configuration file to the prospective configuration file.

6. The computer-implemented method of claim 1, wherein the instructing the first request server to direct future requests of the first request server to the new worker server comprises:
generating a backup communication layer based on a primary communication layer of the first management system;
assigning the backup communication layer to the new management system; and
instructing the first request server to direct the future requests of the first request server through the backup communication layer.

7. The computer-implemented method of claim 1, wherein the new management application comprises a set of code that is updated from the first management application.

8. The computer-implemented method of claim 1, wherein the first set of resources of the first management system further support a first response server, and the computer-implemented method further comprising:
starting a new response server of the new management system, wherein the new response server utilizes the first set of resources of the first management system.

9. A system comprising:
a memory having computer-readable instructions; and
one or more processors for executing the computer-readable instructions, the computer-readable instructions comprising:
generating a new management application based on a first management application, wherein the first management application operates a first management system;
assigning a first set of resources of the first management system to the new management application, wherein the first set of resources support a first request server and a first worker server;
starting a new worker server of the new management system, wherein the new worker server utilizes the first set of resources of the first management system;
instructing the first request server to send a first set of future requests of the first request server to the new worker server; and
instructing the first request server to redirect a remainder of the future requests of the first request server to a new request server of the new management application;
wherein the new management application operates a new management system based on the first management system.

10. The system of claim 9, wherein the new management application is further based on a second management system, and the computer-readable instructions further comprising:
assigning a second set of resources of the second management system to the new management application, wherein the second set of resources support a second request server and a second worker server;
wherein the new worker server utilizes the second set of resources of the second management system;
instructing the second request server to direct future requests of the second request server to the new worker server; and
instructing the second request server to redirect future requests to the new request server of the new management application;
wherein the new management system is a merger of the first management system and the second management system.

11. The system of claim 10, wherein the merging is performed absent taking the first management system or the second management system offline.

12. The system of claim 10, wherein a first configuration file defines a configuration of the first management system, and wherein a second configuration file defines a configuration of the second management system, and the computer-readable instructions further comprising:

receiving an instruction to merge the first management system and the second management system, wherein the instruction is associated with a prospective configuration file defining a configuration of the new management system.

13. The system of claim 12, the computer-readable instructions further comprising identifying a redundancy in the new management system by comparing the first configuration file and the second configuration file to the prospective configuration file.

14. The system of claim 9, wherein the instructing the first request server to direct future requests of the first request server to the new worker server comprises:

generating a backup communication layer based on a primary communication layer of the first management system;

assigning the backup communication layer to the new management system; and instructing the first request server to direct the future requests of the first request server through the backup communication layer.

15. A computer-program product for updating a management system, the computer-program product comprising a computer-readable storage medium having program instructions embodied therewith, the program instructions executable by a processor to cause the processor to perform a method comprising:

generating a new management application based on a first management application, wherein the first management application operates a first management system;

assigning a first set of resources of the first management system to the new management application, wherein the first set of resources support a first request server and a first worker server;

starting a new worker server of the new management system, wherein the new worker server utilizes the first set of resources of the first management system;

instructing the first request server to send a first set of future requests of the first request server to the new worker server; and instructing the first request server to redirect a remainder of the future requests of the first request server to a new request server of the new management application;

wherein the new management application operates a new management system based on the first management system.

16. The computer-program product of claim 15, wherein the new management application is further based on a second management system, and the method further comprising:

assigning a second set of resources of the second management system to the new management application, wherein the second set of resources support a second request server and a second worker server;

wherein the new worker server utilizes the second set of resources of the second management system;

instructing the second request server to direct future requests of the second request server to the new worker server; and instructing the second request server to redirect future requests to the new request server of the new management application;

wherein the new management system is a merger of the first management system and the second management system.

17. The computer-program product of claim 16, wherein the merging is performed absent taking the first management system or the second management system offline.

18. The computer-program product of claim 16, wherein a first configuration file defines a configuration of the first management system, and wherein a second configuration file defines a configuration of the second management system, and the method further comprising:

receiving an instruction to merge the first management system and the second management system, wherein the instruction is associated with a prospective configuration file defining a configuration of the new management system.

19. The computer-program product of claim 18, wherein the program instructions executable by the processor cause the processor to perform the method further comprising identifying a redundancy in the new management system by comparing the first configuration file and the second configuration file to the prospective configuration file.

20. The computer-program product of claim 15, wherein the instructing the first request server to direct future requests of the first request server to the new worker server comprises:

generating a backup communication layer based on a primary communication layer of the first management system;

assigning the backup communication layer to the new management system; and instructing the first request server to direct the future requests of the first request server through the backup communication layer.

\* \* \* \* \*